United States Patent [19]

Diepers

[11] Patent Number: 4,853,815
[45] Date of Patent: Aug. 1, 1989

[54] MAGNETIC THIN-FILM HEAD ON A NONMAGNETIC SUBSTRATE FOR VERTICAL MANGETIZATION

[75] Inventor: Heinrich Diepers, Höchstadt, Fed. Rep. of Germany

[73] Assignee: Siemens Aktiengesellschaft, Munich, Fed. Rep. of Germany

[21] Appl. No.: 806,770

[22] Filed: Dec. 9, 1985

[30] Foreign Application Priority Data

Dec. 21, 1984 [DE] Fed. Rep. of Germany ....... 3446996

[51] Int. Cl.⁴ ............................................. G11B 5/147
[52] U.S. Cl. ...................................... 360/126; 360/119
[58] Field of Search ....................... 360/110, 125–127, 360/119; 29/603

[56] References Cited

U.S. PATENT DOCUMENTS

| | | | |
|---|---|---|---|
| 3,639,699 | 2/1972 | Tieman | 360/126 |
| 3,887,945 | 6/1975 | Nepela et al. | 360/113 |
| 4,317,149 | 2/1982 | Elser et al. | 360/126 |
| 4,429,337 | 1/1984 | de Wilde | 360/123 |
| 4,458,279 | 7/1984 | Katz | 360/123 |
| 4,490,760 | 12/1984 | Kaminaka et al. | 360/126 |
| 4,550,353 | 10/1985 | Hirai et al. | 360/125 |

FOREIGN PATENT DOCUMENTS

| | | | |
|---|---|---|---|
| 0012912 | 9/1980 | European Pat. Off. | |
| 0071489 | 9/1983 | European Pat. Off. | |
| 0058124 | 5/1981 | Japan | 360/126 |
| 0113411 | 7/1982 | Japan | 29/603 |
| 0009209 | 1/1983 | Japan | 360/126 |
| 0128022 | 7/1983 | Japan | 360/126 |
| 0171709 | 10/1983 | Japan | 360/126 |

OTHER PUBLICATIONS

IEEE Trans. on Magnetics, vol. Mag—16, No. 1, Jan. 1980, pp. 71–76.
Feinwerktechnik & Messtechnig, Mar. 1980, pp. 53–59.
Siemens-Zeitschrift, 1978, pp. 434–437.
Introduction to Microlithography—ACS Symp. 219, 1983, title pg, pp. 18–19.
ION Bombardment Modification of Surfaces, 1984, pp. 372, 373, 383, title page.

*Primary Examiner*—Stuart N. Hecker
*Assistant Examiner*—David J. Severin
*Attorney, Agent, or Firm*—Kenyon & Kenyon

[57] ABSTRACT

A magnetic thin-film head for a recording medium that can be magnetized vertically comprises a ring head-like conduction body which carries the magnetic flux and is applied to a nonmagnetic substrate. The conduction body has two magnet legs, the end pole pieces of which are arranged with a small gap width from each other and which have leg parts which are spaced wider than the gap width, and between which the turns of a write/read coil winding extend. This magnetic head provide manufacturing advantages, can be produced with high reproducibility and provides a high efficiency in the write and read function. The substrate is equipped with a depression, in which, at least largely, the leg part of one of the magnet legs and the turns of the write/read coil winding are disposed.

4 Claims, 1 Drawing Sheet

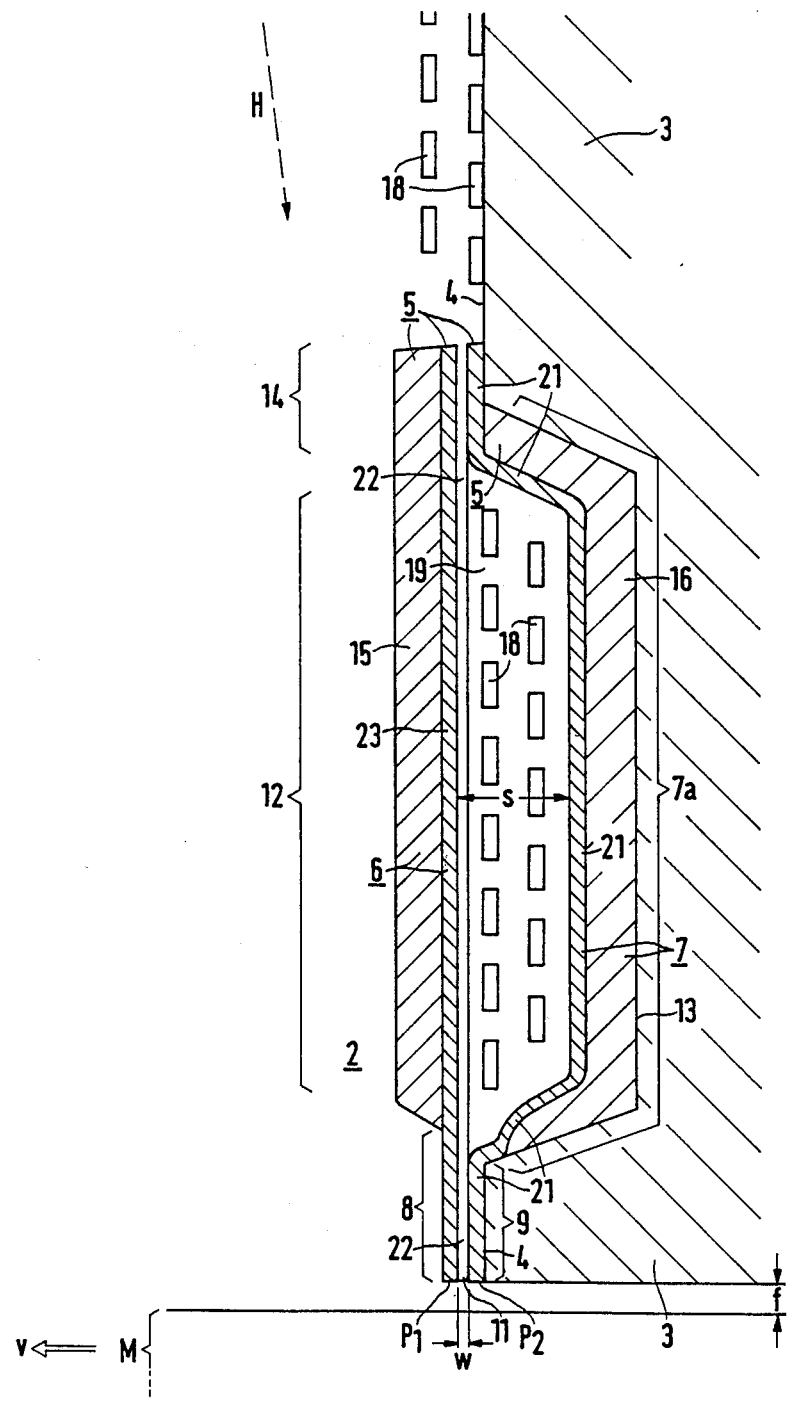

MAGNETIC THIN-FILM HEAD ON A NONMAGNETIC SUBSTRATE FOR VERTICAL MANGETIZATION

BACKGROUND OF THE INVENTION

The present invention relates to a magnetic thin-film head for a recording medium that can be magnetized perpendicularly (vertically) having a magnetic conduction body which is applied to a nonmagnetic substrate, is of ring head-like shape and contains two magnet legs of which the end pole pieces facing the recording medium are arranged one behind the other as seen in the direction of motion of the head and having a predetermined small gap width from each other and having leg parts which are spaced farther than the gap width and defining a space therebetween through which the turns of a write/read coil winding extend. Such a magnetic head can be found, for instance, in European Patent No. 0,012,912A1.

The principle of vertical magnetization for the storage of information is generally known (see, for instance, "IEEE Transactions on Magnetics", vol. MAG-16, no. 1, January 1980, pages 71 to 76.) For this principle, which is frequently also called vertical magnetization, special recording media in the form of rigid magnetic storage discs, individual flexible discs (floppy discs) or magnetic tape are required. Such a recording medium comprises at least one magnetizable storage layer of predetermined thickness which contains a magnetically anisotropic material, particularly of a CoCr alloy. The axis of the so-called easy magnetization of this layer is directed perpendicularly to the surface of the medium. By means of a special magnetic head, the individual pieces of information can then be written in by appropriate magnetization of the storage layer along a track as bits in successive sections, also called cells or blocks. The bits have here a predetermined extent in the longitudinal direction of the track, also designated as wavelength. This extent can be substantially smaller than the limit which is set for storage according to the principle of longitudinal (horizontal) magnetization by the demagnetization. Thus, the information density in the recording media can be increased accordingly by vertical magnetization.

The magnetic write and read head known for the principle of longitudinal magnetization, i.e., heads with which the write as well as the read function can be executed, however, cannot be adopted directly for vertical magnetization. Although, if these heads are used, which generally have ring head-like shape, the flux arrangement desired for the principle of vertical magnetization to form a circuit closed as far as possible with low magnetic reluctance, can be achieved, it is difficult to generate a sufficiently strong write field in the vertical direction with high bit densities and correspondingly small gap width of the ring head.

Therefore, there is reason to develop special magnetic write/read heads for this principle of vertical magnetization. A magnetic head suited for this purpose such as can be found, for instance, in the above European Patent Application, comprises, for conducting the magnetic flux, a magnetic conduction body applied to a plane nonmagnetic substrate of, in particular, ring head-like shape. This conduction body consisting of magnetizable material comprises two magnet legs, of which the end pole pieces facing the recording medium are arranged one behind the other as seen in the direction of motion of the head, and at a predetermined small spacing, also called gap width. The region of the end pole pieces is followed by a region of the head, in which the magnet legs are brought to a larger mutual spacing. In this manner a sufficiently wide space is obtained between the two magnet legs, through which the turns of a write and read coil winding extend. The ring head-like shape of the conduction body is utilized for the write function as well as for the read function as a magnetic head.

The individual parts of this magnetic head are applied on a plane substrate by a thin-film technique. This technology is generally known for write/read heads (see, for instance, "Feinwerktechnik und Messtechnik", 88th year, no. 2, March 1980, pages 53 to 59, or "Siemens-Zeitschrift", vol. 52, no. 7, 1978, pages 434 to 437).

According to this technique, magnetic thin-film heads are made by applying on a plane substrate a sequence of numerous layers of magnetic material such as, for instance, NiFe, of insulating material such as SiO, as well as varnishes and electrically conductive material such as copper. The desired geometric design of these layers such as the formation of a flat arrangement of a coil winding for generating a write/read coil winding is accomplished, for instance, by photolithographic processes by first applying varnish layers, exposure via masks and then chemical structuring. Thereupon, the structure obtained is transferred by purely chemical etching methods or by plasma etching methods into the metal or insulating layer to be structured. Since these layers must be applied and structured on top of each other, overall heights of 10 to 20 $\mu$m and more are obtained, depending on the shape of the head. With an increasing number of layers, however, the structuring becomes less accurate; the positioning accuracy of the respectively last mask to the lowest structured layer decreases. This is also the case if the successive masks are always adjusted relative to the first, lowest structure, and specifically, due to the adjustment tolerances and the continuously changing imaging conditions from layer to layer, even if they still can be corrected in part. This applies particularly to the so-called hard-contact method which, because of its otherwise high imaging fidelity and the possibility of imaging the very finest structure in the $\mu$m range is generally used and in which the mask is in direct contact with the layer of varnish on the substrate (see, for instance, "Introduction to Microlithography", ACS Symposium, Series 219, Washington, 1983, especially pages 18 and 19). For manufacturing the magnetic head shown in the above European Patent application, the last operations, namely, the structuring of the outer magnet leg, which is further removed from the substrate and which opens into the narrow writing or reading pole end piece with a width of, for instance, 5 to 50 $\mu$m, are particularly difficult, since this must be done from a height of about 10 $\mu$m or more; for, the mask required for the structuring is always placed on the highest points. At this particularly critical point this leads to blurred images, undesirable structure deviations and to a lack of reproducibility and an accordingly high rejection rate.

A further problem arises from the fact that the lower magnet leg, i.e., the magnet leg facing the substrate, is reinforced by an additional layer several micrometers thick, of magnetic material in order thus to reduce the magnetic reluctance in the magnetic circuit of the magnetic conduction body and to thereby increase the efficiency of the entire magnetic head. With respect to the known magnetic head, it is therefore considered advantageous to bring this further reinforcing magnetic layer as close as possible to the tip of the magnetic head or the corresponding end pole piece. With this, however, the danger exists that magnetic lines of flux are short-circuited between the forward edge of the further magnetic layer and the outer upper magnet leg, and consequently the lines of flux do not emerge and are not conducted via the two end pole pieces serving as the write/read leg tips.

SUMMARY OF THE INVENTION

It is therefore an object of the present invention to improve the magnetic head described above such that it can be manufactured in a relatively simple manner with high reproducibility, and where unpermissible structural deviations are largely precluded. In addition, it should be possible to assure a relatively high efficiency for the write as well as for the read function.

The above and other objects of the present invention are achieved by a magnetic thin-film head for a recording medium that can be magnetized vertically, having a magnetic conduction body for carrying magnetic flux, the body being applied to a nonmagnetic substrate, the head being of ring head-like shape and comprising two magnet legs having end pole pieces, the end pole pieces facing the recording medium and being arranged one after the other as viewed in the direction of motion of the head, and having a predetermined small gap width therebetween, the leg parts being spaced farther than the gap width and defining a space in a region of the head distant from the pole pieces and through which space the turns of a write/read coil winding extend, the substrate being provided with a depression wherein at least a substantial portion of a part of one of the magnet legs and the turns of the write/read coil winding are disposed.

In the magnetic head according to the invention, its layers are no longer applied on top of each other to a plane substrate, but the preponderant part of the entire magnetic head is embedded in a depression in a substrate in such a manner that the end pole pieces required for the write and read function rest directly on the substrate surface in a manner known per se. This construction has the particular advantage that a high head design which is unfavorable for the macrostructure ring, especially of the pole end piece of the outer magnet leg which is further removed from the substrate, is avoided at least to a large degree and therefore, the two pole end pieces can be varnished with high precision and be structured by a high-resolution mask method. In addition, the danger of a magnetic short circuit by the lower magnet leg facing the substrate due to its magnetic reinforcement layer is avoided because the reinforcements of the magnet legs can lie on the outsides of the respective legs. The magnet legs and reinforcement layers together form the magnetic conduction body.

Other objects, features and advantages of the present invention will be apparent from the detailed description which follows.

BRIEF DESCRIPTION OF THE DRAWING

The invention will be explained in greater detail in the following detailed description with reference to the single drawing FIGURE, which shows an embodiment of a magnetic head according to the invention in a schematic longitudinal section.

DETAILED DESCRIPTION

With reference now to the drawing, the single FIGURE shows a magnetic head, detailed only partially in the figure, for writing and reading. A start is made from ring head-like embodiments known per se with a layerwise build-up fabricated by thin-film technology for the principle of vertical magnetization (see, for instance, the mentioned European Patent Application or European Patent No. 0 071 489 A2). The head which is generally designated with 2 in the figure is supported by a substrate 3 which forms the front or rear side of a customary element designated as an aerodynamic or flying body which is not detailed in the figure and the surface plane of which is designated with 4. This head is to be guided relative to a recording medium M which can be magnetized vertically and is known per se, at a low flight altitude f of, for instance, 0.2 μm. The relative direction of motion of the recording medium M, which is conducted, for instance, under the head relative to the head is indicated by a line with arrows, designated with v.

The magnetic head 2 comprises a conduction body 5 which carries the magnetic flux and which consists of a magnetically soft material suitable therefor. In this material, the so-called easy magnetization is always to be directed, at least to a large degree, perpendicularly to the conduction direction of the magnetic flux. The magnetic conduction body 5 comprises two magnet legs 6 and 7 which are aligned at least approximately perpendicularly to the surface of the recording medium and in particular, at their end pole pieces 8 and 9 facing the recording medium M, and form there respective magnet poles $P_1$ and $P_2$. Between these two end pole pieces, an air gap 11 is formed with an advantageously small longitudinal, i.e., pointing in the direction of motion v, width w of less than 1 μm, especially of about 0.5 μm. In a central region 12 of the head 2, the distance between the two magnet legs 6 and 7 is enlarged relative to this gap width w. To this end, the substrate 3, according to the invention, is provided in this region with a tray-like depression 13, through which the leg part of the magnet leg 7 designated with 7a extends. The magnet leg 7 facing the substrate 3 therefore leads with its leg part 7a following its end pole piece 9 to a larger distance s relative to the outer magnet leg 6 which is designed as a straight leg and is farther away from the substrate 3. Outside the region 12, on the side facing away from the recording medium M, the magnet leg 7 is added in a manner known per se in a connection region 14 to the magnet leg 6, so that the ring head-like shape of the magnetic head 2 is obtained.

As further shown in the FIGURE, the two magnet legs 6 and 7 have in the region of their end pole pieces 8 and 9, reinforcement layers 15 and 16 of magnetizable material which advantageously form the outer side of the magnetic conduction body 5.

In addition, the magnetic head 2 comprises, for the read function as well as for the write function, according to the principle of vertical magnetization, a flat coil winding 18 and in particular a multilayer coil winding, the turns of which extend through the space 19 which is formed between the magnet leg 6 and 7 in the central region 12.

Since the thin-film magnetic head 2 must handle large current loads for the write function, appropriately good cooling must be assured. This is achieved particularly effectively by embedding the head in the substrate 3, as thereby a large contact area is created between the head and the substrate. As the substrate material, TiC(30) provided with an Al₂O₃ layer is preferably used which contains 30% $Al_2O_3$. Since this material is electrically conductive due to the titanium carbide component, the substrate 3 must additionally be provided with an $Al_2O_3$ layer for insulation. Instead of TiC, the substrate material can comprise AlN which has a still higher thermal conductivity, and in addition, insulates electrically.

For the fabrication of the magnetic head 2, the depression 13 is first created in the substrate 3 by removing the substrate material through ion beam bombardment or reactive ion etching at certain points which are given by mask openings. Thereupon the reinforcing magnetic layer 16, for instance, of NiFe which is 2 to 3 μm thick is applied, where vapor deposition or sputter techniques can be used. The magnetic material which is deposited here outside of the depression 13 on the substrate surface, is subsequently removed again, for instance, by mechanical polishing. The removal is preferably carried out by an oblique ion bombardment such as is illustrated, for instance, in the publication "Ion Bombardment Modification of Surfaces", Elsevier-Verlag 1984, particularly pages 372, 373 and 383. The corresponding incidence direction or the angle is indicated approximately in the FIGURE by an arrow designated with H. The ions which impinge nearly vertically in the ion bombardment in the transition range between part 9 and region 12 of the magnetic head cause a shortening or lowering of the outer magnetic layer 16 at this point, while on the opposite side in the transition of the partial regions 14 and 12 due to shading by the substrate edge. Thereupon, the application of a thin magnetic layer approximately 1 μm thick forms the body proper of the magnet leg 7, and particularly by a sandwich technique, i.e., in a layer sequence of magnetic layer, insulator and magnetic layer. In the transition region between the part 9 and the region 12, the magnetic layer 21 rests directly against the inclined substrate surface and specifically due to the mentioned lowering of the outer magnetic layer 16. The lowering thus causes a fast gain in distance between the magnetic layers 21 and 23 with the advantage that the conduction of the magnetic flux takes place predominantly and reinforced in the vicinity of the end pole pieces 8 and 9. The further process steps then serve for developing the turns of the write/read coil winding 18, where insulating varnishes, copper and again insulating varnishes are applied in several sequence steps. Advantageously, the outer varnish layer terminates, flush with the surface, with the parts of the layer 21 of the magnet leg 7 which are deposited on the plane 4 of the substrate surface outside the depression 13. Subsequently, a thin insulating layer 22 for the mutual insulation of the two magnet legs 6 and 7 and in particular for filling the air gap 11 are applied. This layer must consist of $SiO_2$ or $Al_2O_3$. Finally, the upper magnet leg 6 is made again in the form of a sandwich layer 23 forming the body of this leg proper from a sequence of a magnetic layer, insulator and magnetic layer with a thickness of about 1 μm and the reinforcement layer 15 of about 3 to 4 μm thickness. This is followed further by process steps known per se for completing the magnetic head. In the FIGURE, however, the insulating layers required for building up the magnetic head according to the invention are not detailed, except for the gap layer 22, for reasons of clarity.

In the foregoing specification, the invention has been described with reference to a specific exemplary embodiment thereof. It will, however, be evident that various and changes may be made thereunto without from the broader spirit and scope of the invention as forth in the appended claims. The specification and drawings are, accordingly, to be regarded in an illustrative rather than a restrictive sense.

What is claimed is:

1. A magnetic thin-film head for a recording medium that can be magnetized vertically, having a magnetic conduction body for carrying magnetic flux, said body being applied to a nonmagnetic substrate, said head being of ring head-like shape and comprising two magnet legs having end pole pieces, said end pole pieces facing the recording medium and being arranged one after the other as viewed in the direction of relative motion of the head and the medium, and having a predetermined small gap width therebetween, said magnet legs further having leg parts spaced farther than the gap width and defining a space in as region of said head distant from said pole pieces and through which space the turns of a write read coil winding extend, the substrate having a depression formed directly in the substrate wherein at least a substantial portion of a part of one of said magnet legs and the turns of the write/read coil winding are disposed, the magnet leg which faces the substrate and which is disposed in the depression and the turns of the write/read coil winding which is embedded in insulating material form, at least approximately, a common plane outer surface, the other magnet leg being arranged spaced therefrom by an insulating layer, said magnet legs each being provided with a magnetic reinforcement layer except for in the vicinity of the pole pieces, said reinforcement layers forming respective outer sides of the magnetic conduction body, the reinforcement layer for the magnet leg which faces the substrate being provided completely in said depression.

2. The magnetic head recited in claim 1, wherein the substrate comprises at least one of $Al_2O_3$-TiC or AlN.

3. The magnetic head recited in claim 1, wherein the magnetic conduction body comprises a magnetically soft material.

4. The magnetic head recited in claim 1, wherein the magnetic conduction body comprises a material, the easy magnetization of which is directed largely perpendicularly to the conduction direction of the magnetic flux.

* * * * *